US012795442B2

(12) United States Patent
Potluri et al.

(10) Patent No.: US 12,795,442 B2
(45) Date of Patent: Nov. 10, 2026

(54) SYSTEMS AND METHODS TO SUPPORT EVENT-BASED DEMAND

(71) Applicant: Verizon Patent and Licensing Inc., Basking Ridge, NJ (US)

(72) Inventors: Ravi Potluri, Coppell, TX (US); Abhishek Kumar, Irving, TX (US); Hans Raj Nahata, New Providence, NJ (US)

(73) Assignee: Verizon Pate nt and Licensing Inc., Basking Ridge, NJ (US)

( * ) Notice: Subject to any disclaimer, the term of this patent is extended or adjusted under 35 U.S.C. 154(b) by 294 days.

(21) Appl. No.: 18/400,255

(22) Filed: Dec. 29, 2023

(65) Prior Publication Data

US 2025/0220502 A1 Jul. 3, 2025

(51) Int. Cl.
*H04W 28/02* (2009.01)
*H04W 24/02* (2009.01)

(52) U.S. Cl.
CPC ....... *H04W 28/0289* (2013.01); *H04W 24/02* (2013.01)

(58) Field of Classification Search
None
See application file for complete search history.

(56) References Cited

U.S. PATENT DOCUMENTS 10,070,328 B2 * 9/2018 Anerousis ............. H04W 24/08
11,706,100 B2 * 7/2023 Poteat ..................... H04L 47/83 709/224
11,765,759 B2 * 9/2023 Mueller ................ H04W 72/54 370/329
12,052,147 B2 * 7/2024 Poteat ..................... H04L 41/16
12,369,062 B2 * 7/2025 Chou .................... H04W 48/18
2017/0054641 A1 * 2/2017 Anerousis ............. H04W 24/08
2020/0125389 A1 * 4/2020 Palermo .............. H04W 28/084
2021/0022024 A1 * 1/2021 Yao ........................ H04W 24/08
2021/0144517 A1 * 5/2021 Guim Bernat ...... H04L 41/0843
2021/0152435 A1 * 5/2021 Poteat ................. H04L 41/5022
2021/0258866 A1 * 8/2021 Chou .................... H04W 24/02
2021/0306938 A1 * 9/2021 Seetharaman ........ H04W 24/02
2022/0086864 A1 * 3/2022 Sabella ................. H04W 28/06
2022/0368767 A1 * 11/2022 Subramaniam ......... H04L 67/52
2023/0038751 A1 * 2/2023 Mueller ................ H04W 76/36
2023/0043541 A1 * 2/2023 Mueller ................ H04W 16/14
2023/0129575 A1 * 4/2023 Chou .................... H04W 24/02 370/329
2023/0140034 A1 * 5/2023 Bui ..................... H04L 41/0806 709/203

(Continued)

FOREIGN PATENT DOCUMENTS

WO WO-2023104346 A1 * 6/2023 ............. H04L 67/55

*Primary Examiner* — Jay P Patel

(57) ABSTRACT

A method may include identifying an event in a network and identifying a template in response to the event. The template may identify actions to be performed to service data traffic associated with the event. The method may also include determining, by an event controller, that at least one wireless station in the network has capacity to service data traffic associated with the event and transmitting, by the event controller and based on the identified template, instructions to at least one device to implement changes to the least one wireless station. The method may further include instantiating the changes to the at least one wireless station.

20 Claims, 5 Drawing Sheets

(56) References Cited

U.S. PATENT DOCUMENTS

| | | | | |
|---|---|---|---|---|
| 2023/0370339 | A1* | 11/2023 | Poteat | H04L 41/5022 |
| 2024/0184980 | A1* | 6/2024 | Luthra | G06F 3/0482 |
| 2024/0187964 | A1* | 6/2024 | Pandey | H04W 40/246 |
| 2024/0388509 | A1* | 11/2024 | Poteat | H04L 47/788 |
| 2025/0150839 | A1* | 5/2025 | Moore | H04B 10/27 |

* cited by examiner

SYSTEMS AND METHODS TO SUPPORT EVENT-BASED DEMAND

BACKGROUND INFORMATION

Certain events in a network may cause transient surges in user demand for resources in a wireless network. For example, a large aggregation of users may be located in a particular area for a planned event (e.g., a sporting event or concert), or an unplanned event (e.g., stuck at a train station). Such events often cause a short-term increase in network resource utilization in a localized geographical area that is significantly higher than the average network resource utilization in that area. To support such demand, wireless networks are often designed with capacity to address at least a portion of these surges in demand. However, providing the capacity to support significant short-term surges in demand is typically not feasible due to the costs associated with supporting high, short-term demand.

DETAILED DESCRIPTION OF EXAMPLE EMBODIMENTS

The following detailed description refers to the accompanying drawings. The same reference numbers in different drawings may identify the same or similar elements.

Implementations described herein provide for dynamically detecting a network event that is causing an increase in demand. In one implementation, an event controller that may be implemented in a core network, at an edge network or in another portion of a network may identify a potential demand-increasing event, select a pre-stored template that most closely matches the event and identifies changes and/or additions to the network to service network demand associated with the event. The event controller may then communicate with a service orchestrator to make capacity-related changes to various network elements.

For example, the service orchestrator may scale existing wireless stations to support additional demand and/or instantiate new network elements or functions, including physical network functions and physical network elements and virtualized network functions and virtualized network elements to support the event-related demand. The service orchestrator may also communicate with other network elements to configure the changes to existing elements and/or instantiate new elements and activate the changes and/or new elements, including configuring existing and/or new elements. The modified and/or new elements may then service the event traffic. When the event has ended and demand returns to normal, pre-event levels, the event controller may identify that the event has terminated and scale down the elements used to support the short-term demand associated with the event. As a result, a network may support event-related surges in demand in a real time manner.

The term “network event” or “event” as used herein should be broadly construed to refer to a condition or scenario associated with a network in which an increase in demand above a certain threshold demand is identified. The threshold for detecting an event may be set by a service provider operating the network.

Figure 1:
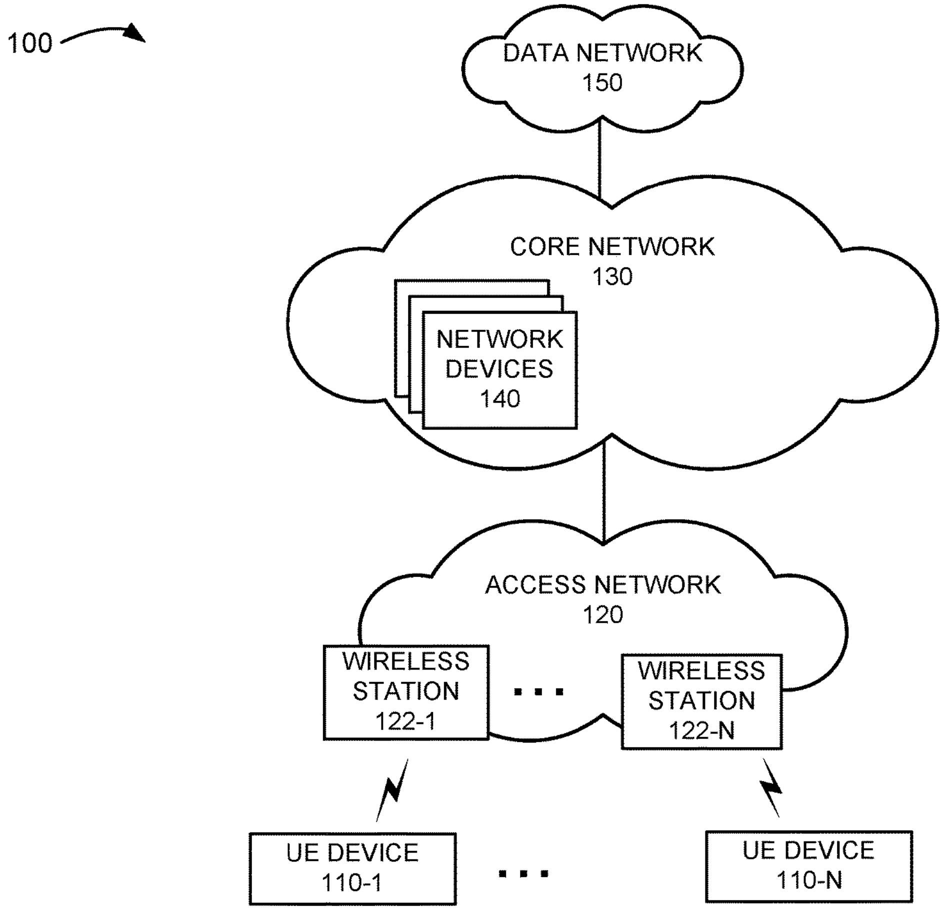
FIG. 1 illustrates an exemplary environment in which systems and methods described herein may be implemented.

FIG. 1 is a diagram illustrating an exemplary environment 100 in which systems and methods described herein may be implemented. Referring to FIG. 1, environment 100 includes user equipment (UE) devices 110-1 through 110-N, access network 120, wireless stations 122-1 through 122-N, core network 130, network devices 140 and data network 150.

UE devices 110-1 and 110-N (referred to herein individually as UE device or UE 110, and collectively as UE devices or UEs 110) may include any computing device, such as a personal computer (PC), a laptop computer, a server, a tablet computer, a notebook, a Chromebook®, a mobile device, such as wireless or cellular telephone device (e.g., a conventional cell phone with data processing capabilities), a smart phone, a personal digital assistant (PDA) that can include a radiotelephone, any type of mobile computer device or system, a game playing device, a music playing device, a home appliance device, a home monitoring device, a virtualized system, a wearable device (e.g., a wrist watch, glasses, etc.), an Internet of Things (IoT) device, a Category M1 (Cat-M1) device, a machine type communication (MTC) device, etc., that includes communication functionality.

UE device 110-1 may connect to access network 120 via wireless station 122-1 and UE device 110-N may connect to access network 120 via wireless station 122-N. UE devices 110 may also connect to other devices in environment 100 via other techniques, such as wired, wireless, optical connections or a combination of these techniques. UE device 110 and a person that may be associated with UE device 110 (e.g., the party holding or using UE device 110) may be referred to collectively as UE device 110 or UE 110 in the description below.

Access network 120, also referred to herein as radio access network (RAN) 120, may provide access to core network 130 for wireless devices, such as UE devices 110. Access network 120 may enable UE device 110 to connect to core network 130 for Internet access, non-Internet Protocol (IP) data delivery, cloud computing, mobile telephone service, Short Message Service (SMS) message service, Multimedia Message Service (MMS) message service, and/or other types of data services. Access network 120 may provide access to core network 130, a service or application layer network, a cloud network, a multi-access edge computing (MEC) network, a fog network, etc. Furthermore, access network 120 may enable a device in core network 130 to exchange data with UE device 110 using a non-IP data delivery method such as Data over Non-Access Stratum (DoNAS).

Access network 120 may also include a Fifth Generation (5G) access network or another advanced network, such as a Fourth Generation (4G) Long Term Evolution (LTE) access network. For example, access network 120 may include the functionality of a 5G network, such as 5G RAN communicating via millimeter (mm) Wave technology, a 5G RAN communicating via C-band technology or other types of 5G networks. Access network 120 may also include a 4G RAN.

Access network 120 may also include: support for advanced or massive multiple-input and multiple-output (MIMO) antenna configurations (e.g., an 8×8 antenna configuration, a 16×16 antenna configuration, a 256×256 antenna configuration, etc.); support for cooperative MIMO (CO-MIMO) configurations; support for carrier aggregation; relay stations; Heterogeneous Networks (HetNets) of overlapping small cells and macrocells; Self-Organizing Network (SON) functionality; machine type communication (MTC) functionality, such as 1.4 MHz wide enhanced MTC (eMTC) channels (also referred to as Cat-M1), Low Power Wide Area (LPWA) technology such as Narrow Band (NB) IoT (NB-IoT) technology, and/or other types of MTC technology; and/or other types of 5G functionality.

Wireless stations 122 (referred to collectively as wireless stations 122 and individually as wireless station 122) may be included in access network 120. Each wireless station 122 may service a number of UE devices 110 and/or other user devices when the UE devices 110 are within radio frequency range of wireless station 122. In one implementation, wireless station 122 may include a 5G base station (e.g., a next generation NodeB (gNB)) that includes one or more radio frequency (RF) transceivers. For example, wireless station 122 may include three RF transceivers and each RF transceiver may service a 120 degree sector of a 360 degree field of view. Each RF transceiver may include or be coupled to an antenna array. The antenna array may include an array of controllable antenna elements configured to send and receive 5G new radio (NR) wireless signals via one or more antenna beams. In other implementations, wireless station 122 may also include a 4G base station (e.g., an evolved NodeB (eNB)) or a 6G base station that communicates wirelessly with UE devices 110 located within the radio frequency range of wireless station 122.

Wireless stations 122 may also include a remote radio head (RRH), a baseband unit (BBU), a radio unit (RU), a central unit (CU), a CU control plane (CU-CP), a CU user plane (CU-UP), a distributed unit (DU), a small cell node (e.g., a picocell device, a femtocell device, a microcell device, a home eNB, etc.), open network devices (e.g., Open RAN (O-RAN) Centralized Unit (O-CU), O-RAN Distributed Unit (O-DU), O-RAN next generation Node B (O-gNB), O-RAN evolved Node B (O-eNB)), 5G ultra-wide band (UWB) nodes, a future generation wireless access station (e.g., a 6G wireless station, etc.), another type of wireless node (e.g., a Wi-Fi device, a WiMAX device, a hotspot device, etc.) that provides a wireless access service, or another type of network device that provides a transport service (e.g., routing and forwarding service), such as a router, a switch, or another type of layer 3 (e.g., network layer of the Open Systems Interconnection (OSI) model) network device. Additionally, or alternatively, wireless stations 122 may include a wired and/or optical device (e.g., modem, wired access point, optical access point, Ethernet device, etc.) that provides network access.

Core network 130 may include one or more wired, wireless and/or optical networks that are capable of receiving and transmitting data, voice and/or video signals. In an exemplary implementation, core network 130 may be associated with a telecommunications service provider (e.g., a service provider providing cellular wireless communication services and wired communication services) and may manage communication sessions of UE devices 110 connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE or LTE Advanced network, a sixth generation (6G) network, and/or a legacy core network. Core network 130 may provide packet-switched services and wireless IP connectivity to various components in environment 100, such as UE devices 110, to provide, for example, data, voice, and/or multimedia services.

Core network 130 may include various network devices 140. Depending on the implementation, network devices 140 may include 5G core network components or network functions (NFs) (e.g., a User Plane Function (UPF), an Access and Mobility Management Function (AMF), a Session Management Function (SMF), a Unified Data Management (UDM) function, a Unified Data Repository (UDR), a Policy Control Function (PCF), a network data analytics function (NWDAF), a Charging Function (CHF), a network exposure function (NEF), an application function (AF), etc.), 4G core network components (e.g., a Serving Gateway (SGW), a Packet data network Gateway (PGW), a Mobility Management Entity (MME), a Home Subscriber Server (HSS), a Policy Charging and Rules Function (PCRF) etc.), or another type of core network components (e.g., future 6G network components). In other implementations, network devices 140 may include combined 4G and 5G functionality, such as a session management function with PGW-control plane (SMF+PGW-C) and a user plane function with PGW-user plane (UPF+PGW-U).

Data network 150 may include, for example, a packet data network. In an exemplary implementation, UE device 110 may connect to data network 150 via core network 130. Data network 150 may also include and/or be connected to a local area network (LAN), a wide area network (WAN), a metropolitan area network (MAN), an autonomous system (AS) on the Internet, an optical network, a cable television network, a satellite network, a wireless network, an ad hoc network, a telephone network (e.g., the Public Switched Telephone Network (PSTN) or a cellular network), an intranet, or a combination of networks.

The exemplary configuration illustrated in FIG. 1 is provided for simplicity. It should be understood that a typical environment may include more or fewer devices than illustrated in FIG. 1. For example, environment 100 may include a large number (e.g., thousands or more) of UE devices 110 and wireless stations 122, as well as multiple access networks 120, core networks 130 and data networks 150. Environment 100 may also include elements, such as gateways, monitoring devices, network elements/functions, etc. (not shown), that aid in providing data services and routing data in environment 100.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
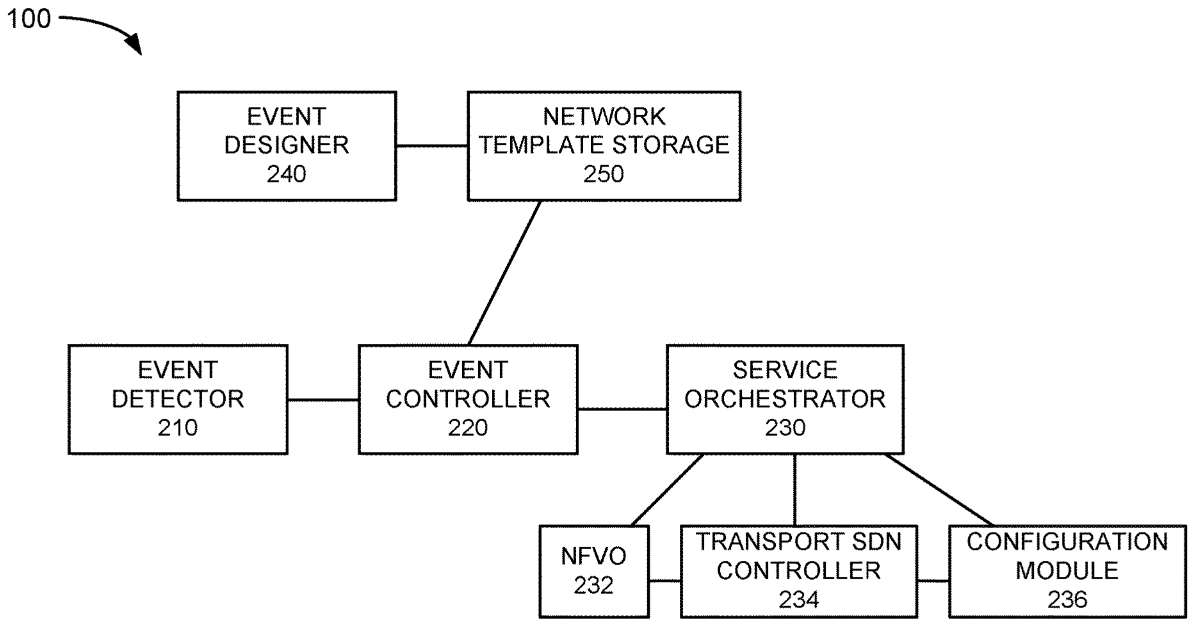
FIG. 2 is a block diagram of components implemented in the environment of FIG. 1 in accordance with an exemplary implementation.

FIG. 2 illustrates a portion of environment 100, including elements implemented in portions of access network 120, core network 130 and/or an edge network located between access network 120 and core network 130 in accordance with an exemplary implementation. Referring to FIG. 2, environment 100 may include event detector 210, event controller 220, service orchestrator (SO) 230, network function virtualization orchestrator (NFVO) 232, transport software defined network (SDN) controller 234, configuration module 236, event designer 240 and network template storage 250. It should be understood that the portion of environment 100 illustrated in FIG. 2 may include other elements/functions.

Event detector 210 may include logic, such as an application executed on a network function (e.g., an NWDAF), an open networks automation platform data collection and analytics engine (ONAP DCAE), or another platform. Event detector 210 may detect and identify network related events, such as events that cause a short-term increase in usage of network resources. In an exemplary implementation, event detector 210 may receive inputs, such as network control plane data inputs (e.g., mobility pattern data, application usage data, and/or other network usage data associated with environment 100), external inputs associated with event detection (e.g., web site inputs, such as social media inputs associated with users providing information regarding a planned or unplanned event), etc. Based on the inputs and/or other information, such as historical usage patterns, event detector 210 may identify events and generate event triggers associated with the events. Each event trigger may include an event type, a location associated with the event, and/or application profile(s) associated with the event, as described in detail below.

Event controller 220 may include logic configured to receive event triggers from event detector 210 and communicate with other devices to facilitate the implementation of network changes in response to events. For example, event controller 220 may access network template storage 250 to identify a template associated with an event that best matches the received event trigger corresponding to a currently occurring event. The identified template may include actions to be taken with respect to elements in access network 120 and/or core network 130 to support usage associated with the particular event. In some implementations, event controller 220 may make minor changes to an identified template or various actions in the identified template based on the particular event type, location and/or application profile associated with the event.

Service Orchestrator (SO) 230 may receive information from event controller 220, such as an identified template from network template storage 250 identified by event controller 220 and/or actions associated with the event. For example, SO 230 may receive an identified network template that most closely matches a current event occurring in network environment 100 and interact with other devices/components to implement changes to the network to support data traffic associated with the event. For example, SO 230 may interact with NFVO 232, transport SDN controller 234 and configuration module 236 to scale existing network devices, instantiate new network devices/functions including both physical network devices/functions and virtualized network devices/functions, and configure the network devices/functions to support the event-related demand, as described in detail below.

As an example, SO 230 may transmit information to NFVO 232 indicating that one or more wireless stations are to be reconfigured to increase the network capacity on a particular carrier. Transport SDN controller 234 may configure and/or reconfigure various links in environment 100, such as F1-C/F1-U links, E1 links, etc., to support the increased capacity. Configuration module 236 may configure existing elements and/or new elements to support network traffic. For example, configuration module 236 may configure various wireless stations 122 to add capacity, such as provide new cells or carriers to support the additional demand, provide new NFs (e.g., CU-CPs, CU-UPs, DUs, RUs, etc.) to support additional demand, etc.

Event Designer 240 may include logic and/or an application to support the design of network templates. For example, event designer 240 may be part of a service design controller (SDC) platform that generates templates identifying actions to be performed in response to events. Event Designer 240 may receive feedback information from event controller 220 based on how network environment 100 handled a short-term surge in demand in response to an event. For example, event designer 240 may receive usage/utilization scores of particular applications during the occurrents of events in environment 100. Event Designer 240 may use the feedback information to modify existing templates and/or create new templates. Event Designer 240 may also use the feedback information to evaluate network policies and/or train/retrain a machine learning model associated with designing and/or modifying templates stored in network template storage 250.

Network template storage 250 may store information defining actions to be taken in response to various events in environment 100. For example, network template storage 250 may include a number of templates corresponding to particular types of events in particular portions of environment 100. The templates may identify actions to be taken to support short term surges in demand, as described in detail below. For example, network template storage 250 may include information identifying changes to various wireless stations, changes or various applications (apps), instantiation of new network functions and/or apps, instantiation of new wireless stations 122 or particular elements of wireless stations 122 (e.g., a CU-UP, a CU-CP, etc.) etc.

Environment 100 illustrated in FIG. 2 may include additional devices, elements and/or NFs that are not illustrated. Such devices, elements and/or NFs may provide security, authentication and authorization, network policies, subscriber profiles, network slicing, and/or facilitate the operation of core network 130. It should also be understood that functions described as being performed by various elements in FIG. 2, including elements in core network 130, may be performed by other elements/functions in other implementations.

Figure 3:
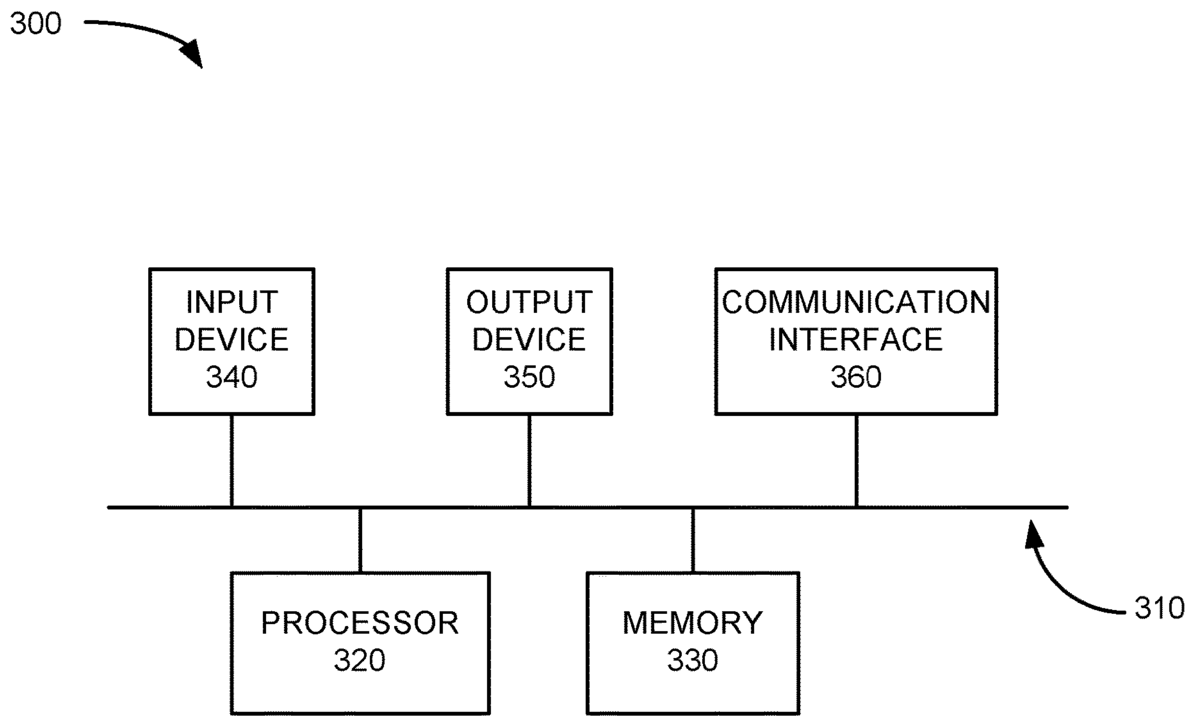
FIG. 3 illustrates logic components implemented in one or more of the devices illustrated in FIGS. 1 and 2 in accordance with an exemplary implementation.

FIG. 3 illustrates an exemplary configuration of a device 300. One or more devices 300 may correspond to or be included in devices in environment 100, such as UE device 110, wireless station 122, elements of wireless stations (e.g., RUs, DUs, CUs), network devices 140, event detector 210, event controller 220, SO 230, NFVO 232, transport SDN controller 234, configuration module 236, event designer 240, network template storage 250 and other devices included in environment 100. Referring to FIG. 3, device 300 may include bus 310, processor 320, memory 330, input device 340, output device 350 and communication interface 360. The exemplary configuration illustrated in FIG. 3 is provided for simplicity. It should be understood that device 300 may include more or fewer components than illustrated in FIG. 3.

Bus 310 may include communication paths between components 320-360 of device 300. Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD).

Memory 330 may also include a magnetic and/or optical recording medium (e.g., a hard disk) and its corresponding drive.

Input device 340 may include a mechanism that permits a user to input information, such as a keypad, a keyboard, a mouse, a pen, a microphone, a touch screen, voice recognition and/or biometric mechanisms, etc. Output device 350 may include a mechanism that outputs information to the user, including a display (e.g., a liquid crystal display (LCD)), a speaker, etc. In some implementations, device 300 may include a touch screen display and may act as both an input device 340 and an output device 350.

Communication interface 360 may include one or more transceivers that device 300 uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network.

In an exemplary implementation, device 300 performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
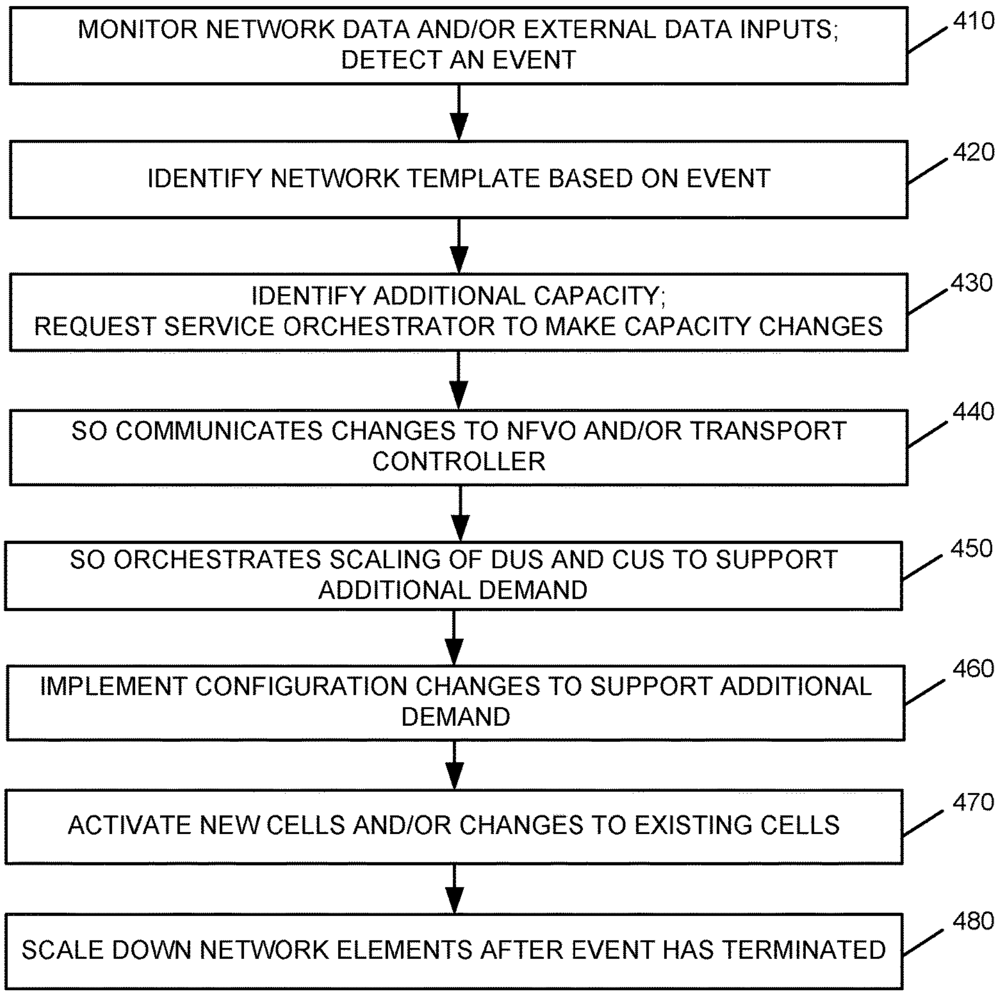
FIG. 4 is a flow diagram illustrating processing associated with detecting an event and dynamically implementing network changes in response to the event.

FIG. 4 is a flow diagram illustrating processing associated with dynamically detecting an event and making network changes based on the event in accordance with an exemplary implementation. Processing may begin with event detector 210 monitoring network environment 100, including network traffic data (block 410). For example, event detector 210 may receive network control plane data, such as mobility pattern data, application usage data, etc. Event detector 210 may also receive and monitor external inputs from outside environment 100, such as web site or social media inputs regarding particular issues that may be occurring in a particular area (block 410). For example, event detector 210 may receive, retrieve, scrape, etc., social media posts/inputs indicating that a problem at a particular train station is occurring or that vehicle traffic on a highway is at a standstill. Event detector 210 may also receive web site or social media inputs regarding a concert or sporting event that is currently taking place at a stadium, etc. Based on monitoring the network data and external inputs, event detector 210 may detect an event in environment 100 (block 410). For example, as described previously, event detector 210 may detect a planned or unplanned event that is causing a short-term increase in network resource demand at a particular geographical area.

In each case, event detector 210 may forward event trigger information, including a location associated with the event, a type associated with the event and/or other information associated with the event (e.g., a severity indicator for the event, such as the number of users likely associated with the event, a likely duration associated with the event, etc.) to event controller 220. Event controller 220 may access network template storage 250 and identify a template that most closely matches the currently occurring event (block 420). For example, based on a location of the event, such as whether the event is occurring in access network 120 and/or a particular portion of access network 120, in an edge network portion of environment 100, in core network 130, etc., as well as the type of event and/or an application profile associated with the event, event controller 220 may identify a stored template that most closely matches the event information. In some implementations, event controller 220 may use artificial intelligence (AI) and/or machine learning (ML) to identify a template that most closely matches the event, as described in detail below with respect to FIG. 5. A template, as described above with respect to FIG. 2, may include a listing of instructions to implement changes to existing elements, instructions to implement new elements/NFs and/or instructions to implement other changes to environment 100 to support event-related demand.

Event controller 220 may also determine whether additional network capacity and/or compute resources are available at one or more sites, such as wireless stations 122. For example, event controller 220 may determine whether an edge network in network environment 100 has compute resources for one or more additional carriers, whether a centralized unit (CU) control plane (CP) and/or CU user plane (UP) have spare capacity for additional carriers, whether an additional wireless station 122 element (e.g., a CU-CP, a CU-UP, DU, etc.) is needed, and/or whether mid-haul capacity for far edge sites have spare capacity that is available for scaling (block 430). In some implementations, event controller 220 may use AI and/or ML to perform cell site selection to identify excess capacity, as described in detail below with respect to FIG. 5. In each case, event controller 220 may identify the additional capacity (block 430). Event controller 220 may signal SO 230 to implement changes associated with the identified template and instantiate the network changes in environment 100 to support the short-term, event-related demand (e.g., provide the additional capacity).

For example, SO 230 may receive the information associated with the identified template corresponding to capacity changes and/or additional cell site information. SO 230 may then orchestrate changes in RAN 120, core network 130, an edge network between RAN 120 and core network 130, etc., based on the identified network template. For example, SO 230 may communicate with NFVO 232 and/or transport SDN controller 234 to instruct wireless station 122-1 to augment the capacity in each available segment at that particular wireless station 122-1 (block 440).

SO 230 may also orchestrate the scaling of DUs and CUs to support additional cells/carriers at a particular cell site (block 450). For example, SO 230 may communicate with transport SDN controller 234 to increase the maximum bandwidth on a temporary basis (e.g., increase the bandwidth from 100 Gb/s to 150 Gb/s on a particular carrier frequency). SO 230 may further communicate with configuration module 236 to provide instructions to configure/reconfigure the appropriate cell sites. For example, SO 230 may instruct configuration module 236 to implement the bandwidth increase, activate new carriers at particular wireless stations 122, add one or more wireless stations 122 and/or add one or more elements to an existing wireless station 122, etc. (block 460). As an example, SO 230 may determine that an existing wireless station 122 that includes four DUs that communicate with one CU-UP and one CU-CP needs an additional CU-UP element to communicate with the four DUs. In this example, SO 230 may communicate with NFVO 232 and/or transport SDN controller 234 to instantiate the new CU-UP. Alternatively, SO 230 may communicate with NFVO 232 and/or transport SDN controller 234 to instantiate a new user plane function (UPF) in core network 130 or at an end network in environment 100. In each case, the reconfigured wireless stations 122 and/or new wireless stations 122 may then be activated to service the event traffic (block 470). In this manner, elements of network environment 100 may detect events and modify and/or provide additional network elements (e.g., physical and/or virtualized network elements/functions) to support the short-term demand associated with events in a real time manner.

Event detector 210 may continue to monitor network traffic. When event detector 210 determines that network traffic/demand returns to normal/pre-event levels, receives external inputs (e.g., social media inputs) or other information regarding the event, event detector 210 may determine that the event has terminated. Event detector 210 may then signal event controller 220 that the event has terminated. Event controller 220 and/or SO 230 may then follow the same processing used to support additional demand to scale down the RAN 120 for the sites servicing the event (block 480). For example, event controller 220 and SO 230 may return wireless stations 122 to the pre-event configurations. In this manner, network environment 100 may be dynamically scaled up/down in a real time manner to support network conditions, such as the occurrence of an event and the termination of the event.

As described above, event detector 210 may detect events and event controller 220 may receive event trigger information to identify network templates and initiate changes to support demand-related traffic. In accordance with an exemplary implementation, event detector 210, event controller 220 and/or SO 230 may include AI and/or ML logic to train event detector 210 to accurately detect events and train event controller 220 and SO 230 to efficiently support event-based network demand.

Figure 5:
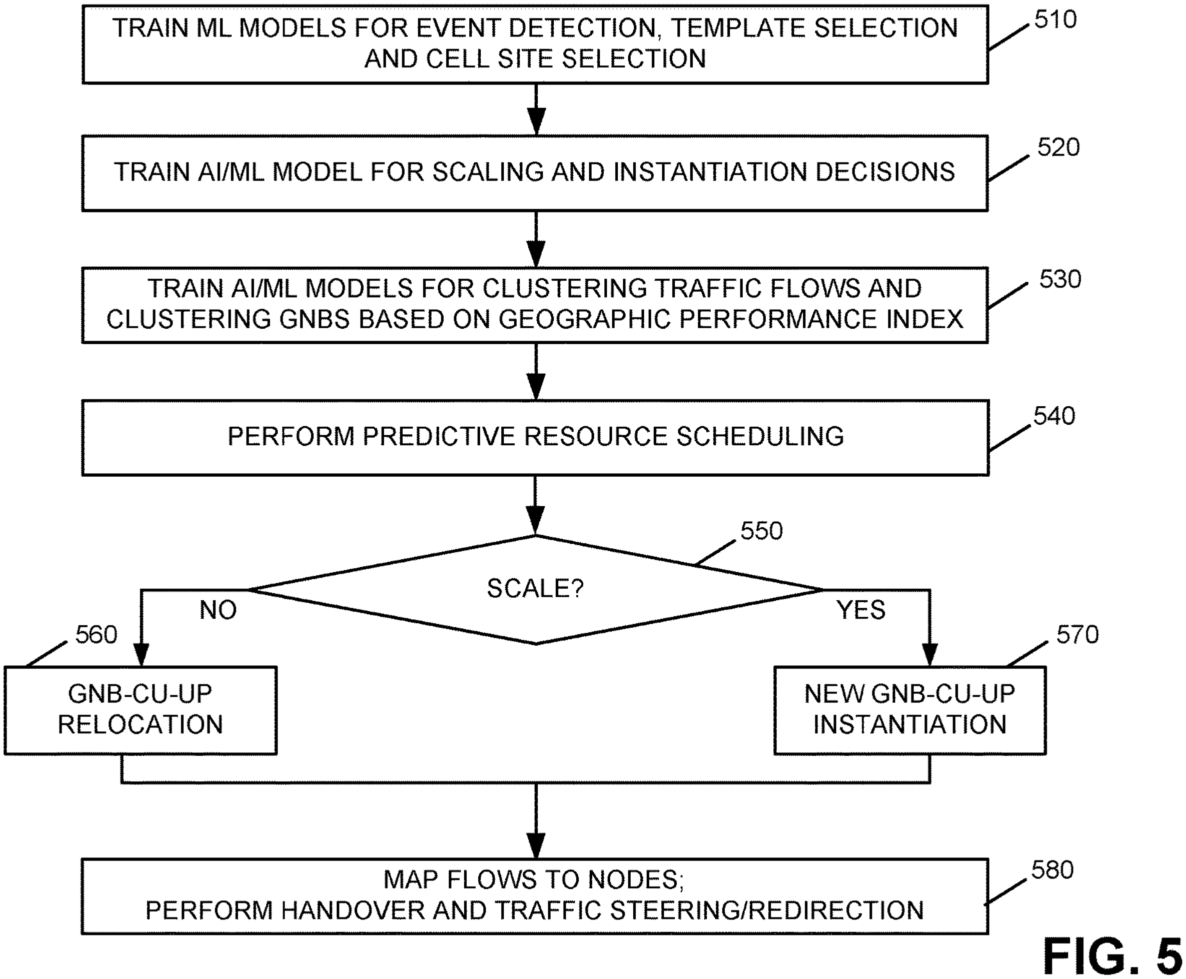
FIG. 5 is a flow diagram illustrating exemplary processing associated with training and implementing network changes in accordance with an exemplary implementation.

FIG. 5 illustrates processing associated with event detector 210, event controller 220 and/or SO 230 using AI and/or ML to detect events, identify an appropriate template associated with the event and perform cell site selection and resource scheduling in accordance with an exemplary implementation. Processing may begin with event controller 220 training an AI/ML model to dynamically monitor and/or manage RAN 120 topology in environment 100 in response to detecting an event causing a sudden burst in network data traffic. For example, in one implementation, event detector 210 may use an adaptive machine learning model based on reinforcement learning (RL) to train event detector 210 to identify events, as opposed to normal, heavy network usage (block 510). In this implementation, event detector 210 may include an RL agent to dynamically monitor and/or manage the RAN 120 topology to detect an event, such as a sudden burst in traffic that has been caused by a relatively short term event in environment 100. For example, event detector 210 may train an ML model to detect events based on RL and using previously detected events (block 510). As described previously, event detector 210 may receive data usage information, such as mobility pattern data, application usage and/or other data usage information, social media inputs, etc. Event detector 210 may use this information for training purposes. In some implementations, event detector 210 may also receive feedback information from environment 100 when traffic patterns from an event match data usage for applications deployed at, for example, edge locations in environment 100.

Event controller 220 may also use ML to train a model with respect to template selection and cell site selection (block 510). For example, for network template selection, event controller 220 may use Supervised Learning (SL), such as a Decision Tree, or Unsupervised Learning, such as Principal Component Analysis (PCA) using K-means clustering, to identify a network template in network template storage 250 and identify a cell site to provide additional network capacity. For example, for template selection, event controller 220 may use location specific attributes, quality of service (QOS) characteristics, event type information, traffic type information, network/cloud types, region-wide policies (e.g., service level agreements (SLAs), etc.) as inputs for training the ML model to identify or select one of the templates stored in network template storage 250. For cell site selection, event controller 220 may input cell resource utilization information, space availability information, latency constraints (e.g., SLA information) and identify a preferred cell site location. For both cell site selection and template selection, the ML models may use decision trees, a random forest of decision trees or another ML learning algorithm. In each case, event controller 220 may train the ML models to perform template selection and cell site selection. In each case, event detector 210 and event controller 220 may train AI/ML models to detect events, select an appropriate template and/or select an appropriate service access point (SAP) or cell site for modifications (block 510).

In accordance with an exemplary implementation, event controller 220 may also train the AI/ML model for predictive scaling and/or instantiation decisions based on traffic trend data (block 520). For example, event controller 220 may use RL, such as Q-learning RL to generate scaling and instantiation decisions based on network conditions and trends. Event controller 220 may also train the AI/ML model for clustering traffic with similar QoS characteristics using, for example, PCA and K-means clustering to cluster traffic flows (block 530). Event controller 220 may also train the AI/ML model for clustering wireless stations 122 (e.g., gNBs) based on geographical performance, including taking latency constraints into consideration (block 530).

After training has been completed, event controller 220 may receive an event trigger from the ML-trained event detector 210. Event detector 220 may then perform predictive resource scheduling (block 540). As part of the predictive resource scheduling, event controller 220 may determine whether to scale existing wireless stations 122 (block 550). If event controller 220 determines that no scaling is needed (block 550—no), event controller 220 may determine to relocate components of an existing wireless station 122 (block 560). For example, event controller 220 may relocate CU-UP components associated with a wireless station 122 to another wireless station 122. If, however, event controller 220 determines that scaling is needed (block 550—yes), event controller 220 may signal SO 230 to instantiate new elements at wireless station 122 and/or instantiate a new wireless station 122 (block 570). For example, event controller may signal SO 230 to instantiate a new gNB CU-UP element in network environment 100. In either case, SO 230 may map data flows supporting the relocated and/or new network elements to the particular destinations (block 580). SO 230 may also perform handover, such as traffic steering and/or traffic redirection to support the event-based demand using the relocated and/or new network elements (block 580). In this manner, event detector 210, event controller 220 and SO 230 may support network-based demand in an efficient manner.

Implementations described herein provide for dynamically detecting a network event that is causing an increase in demand and instantiating network changes to support the increased network demand. In some implementations, modified and/or new network elements, including both physical and/or virtualized network elements/functions, may be configured and/or instantiated to support the increased network demand. When the event has ended, various elements may be scaled down since the increased capacity is no longer needed. In this manner, a network may support event-related surges in demand in a real time manner while efficiently using network resources.

The foregoing description of example implementations provides illustration and description, but is not intended to be exhaustive or to limit the embodiments to the precise form disclosed. Modifications and variations are possible in light of the above teachings or may be acquired from practice of the embodiments.

For example, features have been mainly described above with respect to detecting events that are currently occurring and modifying elements in environment 100 in a reactive manner. In some implementations, event detection may be proactive to identify events that are likely to occur in the near future and provide additional capacity prior to the actual occurrence of the event.

Further, while series of acts have been described with respect to FIGS. 4 and 5, the order of the acts may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code-it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:

identifying an event in a network;

assigning an event type to the event;

identifying a template, from a plurality of stored templates, in response to the event and based on the assigned event type, wherein the template identifies actions to be performed to service data traffic associated with the event;

determining, by an event controller, that at least one wireless station in the network has capacity to service data traffic associated with the event;

transmitting, by the event controller and based on the identified template, instructions to at least one device to implement changes to the at least one wireless station; and instantiating the changes to the at least one wireless station.

2. The method of claim 1, further comprising:

monitoring the network, wherein the monitoring comprises:

monitoring control plane data associated with usage of the network, receiving and reviewing inputs from a web site, and receiving and reviewing data associated with a particular application executed in the network.

3. The method of claim 1, further comprising:

assigning an event type and a location to the event.

4. The method of claim 3, wherein the identifying the template further comprises:

identifying the template based on the location.

5. The method of claim 3, wherein the identifying the template comprises:

identifying, from the plurality of stored templates, the template that most closely matches the assigned event type and the location.

6. The method of claim 1, further comprising:

determining, by the event controller, that at least one of a new device or a new network element is needed to service the data traffic associated with the event; and instantiating the at least one new device or new network element to service the data traffic associated with the event.

7. The method of claim 1, further comprising:

determining that the event has ended; and reconfiguring the at least one wireless station to return to a configuration associated with the at least one wireless station prior to instantiating the changes.

8. The method of claim 1, wherein the identifying the template comprises:

using machine learning to identify the template.

9. The method of claim 1, further comprising:

dynamically modifying network elements to support event-related data traffic.

10. A system, comprising:

at least one device comprising at least one processor, the at least one device configured to:

monitor a network, identify an event in the network, assign an event type to the event, identify a template, from a plurality of stored templates, in response to the event and based on the assigned event type, wherein the template identifies actions to be performed to service data traffic associated with the event, determine that at least one wireless station in the network has capacity to service data traffic associated with event, transmit, based on the identified template, instructions to implement changes to the at least one wireless station, and instantiate the changes to the at least one wireless station.

11. The system of claim 10, wherein when monitoring, the at least one device is configured to:

monitor control plane data associated with usage of the network, receive and review inputs from a web site, and receive and review data associated with a particular application executed in the network.

12. The system of claim 10, wherein the at least one device is further configured to:

assign a location to the event.

13. The system of claim 12, wherein when identifying the template, the at least one device is further configured to:

identify the template based on the event type and the location.

14. The system of claim 12, wherein when identifying the template, the at least one device is configured to:

identify, from the plurality of stored templates, the template that most closely matches the assigned event type and the location.

15. The system of claim 10, wherein the at least one device is further configured to:

determine that at least one of a new device or a new network element is needed to service the data traffic associated with the event, and instantiate the at least one new device or the new network element to service the data traffic associated with the event.

16. The system of claim 10, wherein the at least one device is further configured to:

determine that the event has ended, and reconfigure the at least one wireless station to return to a configuration associated with the at least one wireless station prior to instantiating the changes.

17. The system of claim 11, wherein the at least one device is further configured to:

dynamically modify network elements to support event-related data traffic.

18. A non-transitory computer-readable medium having stored thereon sequences of instructions which, when executed by at least one processor, cause the at least one processor to:

receive an event trigger associated with an event in a network, wherein the event trigger includes an event type;

identify a template, from a plurality of stored templates, in response to the event trigger and based on the event type, wherein the template identifies actions to be performed to service data traffic associated with the event;

determine that at least one wireless station in the network has capacity to service data traffic associated with the event; and transmit, based on the identified template, instructions to implement changes to the at least one wireless station.

19. The non-transitory computer-readable medium of claim 18, wherein the event trigger further includes a location, wherein the instructions further cause the at least one processor to:

identify the template based on the location.

20. The non-transitory computer-readable medium of claim 19, wherein when identifying the template, the instructions cause the at least one processor to:

identify, from the plurality of stored templates, the template that most closely matches the event type and the location.

* * * * *